(12) United States Patent
Klein

(10) Patent No.: US 8,063,171 B2
(45) Date of Patent: Nov. 22, 2011

(54) SELF-HEALING POLYMERS

(75) Inventor: Daniel J. Klein, Powell, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 375 days.

(21) Appl. No.: 12/319,710

(22) Filed: Jan. 9, 2009

(65) Prior Publication Data

US 2010/0174041 A1 Jul. 8, 2010

Related U.S. Application Data

(60) Provisional application No. 61/010,877, filed on Jan. 11, 2008.

(51) Int. Cl.
*C08G 63/44* (2006.01)
*C08G 63/02* (2006.01)

(52) U.S. Cl. ........................................ 528/288; 528/272

(58) Field of Classification Search .................. 528/272, 528/288
See application file for complete search history.

(56) References Cited

OTHER PUBLICATIONS

Wu et al . "Self-healing polymeric materials : A review of recent developments", Prog.Polym.Sci.33(2008), pp. 479-522.*

* cited by examiner

*Primary Examiner* — Milton I Cano
*Assistant Examiner* — Gennadiy Mesh
(74) *Attorney, Agent, or Firm* — Thomas K. McBride, Jr.; Robin W. Edwards; George F. Helfrich

(57) ABSTRACT

A three dimensional structure fabricated from a self-healing polymeric material, comprising poly(ester amides) obtained from ethylene glycol, azelaic acid and 1,1-aminoundecanoic acid, wherein polymeric material has a melt index above 2.5 g/10 min. as determined by ASTM D1238 at 190° C. and 2.16kg, impact resistance and ductility sufficient to resist cracking and brittle fracture upon impact by a 9 mm bullet fired at a temperature of about 29° C. at subsonic speed in a range from about 800 feet/sec to about 1000 feet/sec. It has been determined that the important factors necessary for self-healing behavior of polymers include sufficient impact strength, control of the degree of crystallinity, low melting point and the ability to instantly melt at impacted area.

2 Claims, 1 Drawing Sheet

SELF-HEALING POLYMERS

This application claims the benefit of U.S. Provisional Application Ser. No. 61/010,877 filed Jan. 11, 2008 for Self-Healing Polymers.

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

FIELD OF THE INVENTION

The present invention relates to polymer structures and more particularly to polymer structures exhibiting substantially instant and complete self-healing without external assistance after being penetrated at a site thereon with a bullet or similar projectile.

BACKGROUND OF THE INVENTION

Since the discovery that panels of Surlyn® self-heal after being shot with a bullet at subsonic speeds, it has been of interest to understand the underlying mechanism of this self-healing process. Such understanding could lead to the development of new materials that would self-heal in a variety of environments and temperatures. Included would be applications in space structures, which could contain the internal atmospheres should a breach occur due to micrometeoroid impact.

In recent years there have been many research groups exploring several different mechanisms of self-repairing polymeric systems. One such system involves encapsulation of dicyclopentadiene, then dispersing it into a composite matrix containing catalyst. When crack growth breaks the capsules, the monomer is released. The monomer polymerizes when it comes into contact with the catalyst, thereby hindering further crack propagation and regaining some mechanical strength. Another mechanism involves reversible cross-linking via a heat-initiated Diels-Alder reaction. This system offers advantages over traditional hot plate welding techniques, in which chain entanglements or intermolecular interactions are responsible for regaining strength in the material. The Diels-Alder technique forms covalent bonds to repair the damage in the material.

Recent research has revealed that different grades of Surlyn®, a polymer manufactured by DuPont, underwent recovery after being shot with a 9 mm bullet at subsonic speeds. Although the remaining impressions varied in appearance after impact, depending upon bullet impact speeds, no hole remains in the sample in all cases when shot at ambient temperature. This behaviour is the reason this polymer is used in targets at firing ranges under the name React-A-Seal®.

Surlyn® is a copolymer of ethylene-methacrylic acid, which is neutralized with different counterions. The properties of these and similar ionomers have been studied since the late 1960s. Although these polymers possess many qualities distinctive to ionomers, such as ionic cluster formation, no conclusions have been determined as to why these polymers recover after bullet impact. It has been speculated that ionic cluster formation may be a driving force for the material to flow back together after bullet impact. No subsequent studies on other ionomeric systems were initiated to support this claim, and no satisfactory explanations have been provided to explain the self-healing characteristics of these polymers.

There thus remains a need for determining the mechanisms by which such polymers self-heal, the development of additional self-healing polymers and the production of structures such as fuel tanks fabricated from polymeric materials that exhibit such self-healing characteristics.

OBJECTS OF THE INVENTION

It is therefore an object of the present invention to determine those properties and characteristics of polymeric materials that contribute to self-healing.

It is another object of the present invention to provide fabricated structures of polymeric materials that exhibit self-healing properties.

SUMMARY OF THE INVENTION

According to the present invention, it has been determined that the important factors necessary for self-healing polymers include: good impact strength, control of the degree of crystallinity, low melting point (for materials shot at approximately 25° C.), and the ability to melt flow. In addition to the historically self-healing polymeric materials such as Surlyn®, it has been demonstrated that a very low density polyethylene, referred as a polyolefin plastomer also displays self-healing ability to the same extent as Surlyn®. Other promising polymers included aliphatic polyesters, which can tailor their melting points to specific use temperatures, whereas polymers such as Surlyn® and the very low density polyethylenes may limit to a small range of use temperatures.

DETAILED DESCRIPTION

Figure 1:
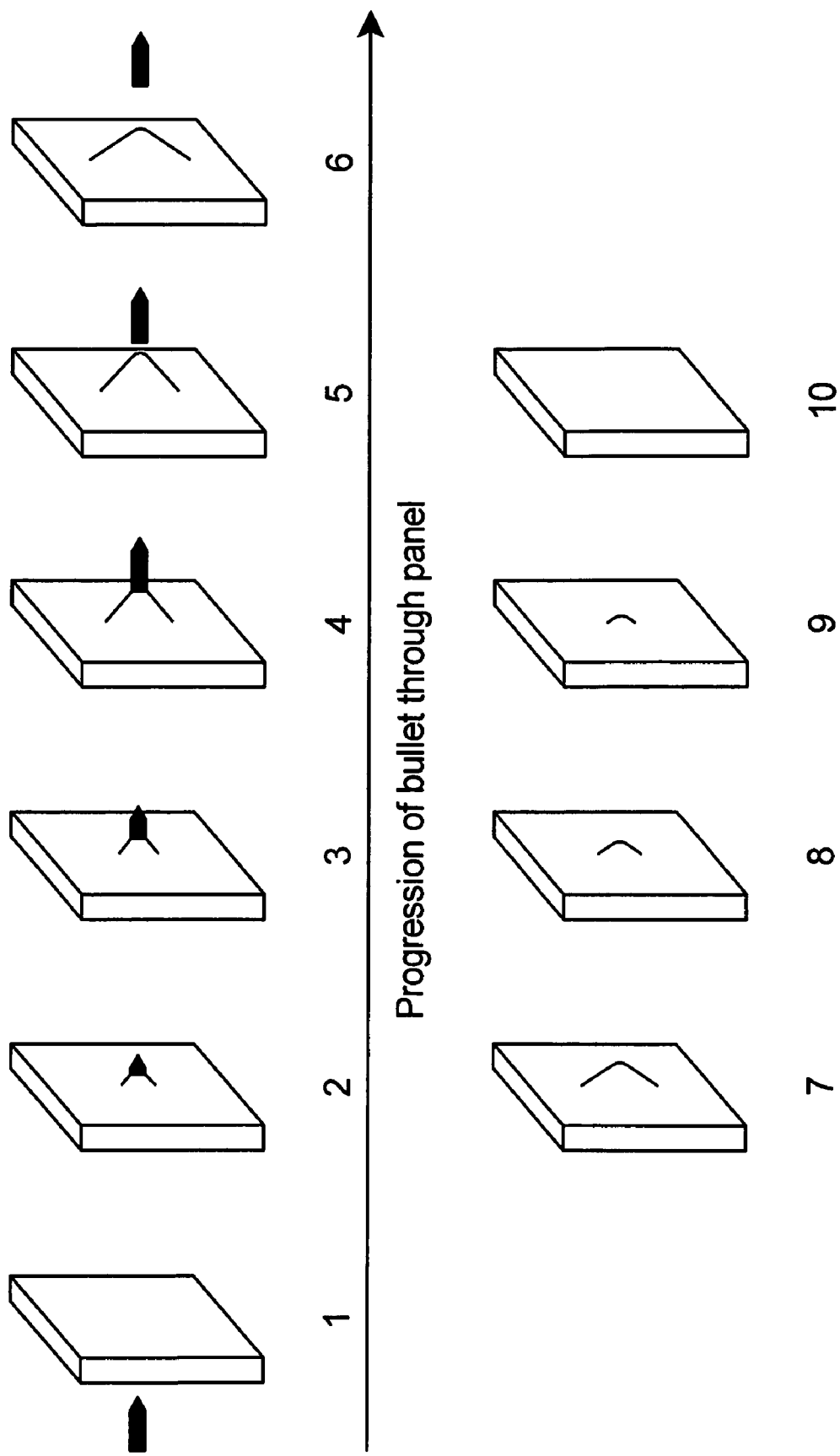
FIG. 1 is a schematic representation of a bullet penetrating a sample of a self-healing polymeric material.

The work described in this patent application began through the study of several commercial polymers to observe the damage after being shot with a 9 mm bullet. After this, new polymers were synthesized utilizing what was learned from the results of the ballistic impact studies. Although previous conclusions focused on ionic cluster formation of SURLYN® (an ionomer resin) as the reason for polymer recovery after bullet penetration, this work pursued another hypothesis. This work sought to prove that recovery was not due to the formation of ionomeric clusters, but other factors such as percent crystallinity, melting point, melt flow, and mechanical properties.

Tables 1 and 2 list the physical properties of the polymers studied in this work. The commercial polymers were chosen that varied the tensile strength, tensile modulus, percent elongation, glass transition temperature ($T_g$), and softening/melting point. Through this process it was determined which factors were important in the recovery of polymer samples after bullet penetration.

TABLE 1

Thermal and crystalline properties of polymers

| Polymer | $T_{m,1}$ (° C.) | $\Delta H_{m,1}$ (J/g) | $T_c$ (° C.) | $\Delta H_c$ (J/g) | $T_{m,2}$ (° C.) | $\Delta H_{m,2}$ (J/g) | $\chi_c$ (%) |
|---|---|---|---|---|---|---|---|
| SURLYN® 8940 | 54, 95 | 53.2 | 66 | −47.5 | 70, 95 | 54.8 | 15.7 |
| VISTALON® 4709 | 48, 64 | 30.6 | 25, 38 | −27.8 | 40 | 33.6 | 22.1 |
| LURAN® 358N | ND | ND | ND | ND | ND | ND | Amorphous |
| STROLUX® 684D | ND | ND | ND | ND | ND | ND | Amorphous |
| LUSTRAN® 448 | ND | ND | ND | ND | ND | ND | Amorphous |
| EASTAR® DN004 | ND | ND | ND | ND | ND | ND | Amorphous |
| ELVAX® 660 | 92 | 81.1 | 76 | −76.2 | 92 | 70.8 | 28.0 |
| TONE® P787 | 58, 63 | 72.9 | 23 | −54.8 | 56 | 60.6 | 55.4 |
| TONE® P767 | 53, 63 | 80.5 | 18 | −56.0 | 54 | 63.7 | 56.0 |
| TONE® P757 | 67 | 83.4 | 21 | −59.6 | 54, 55 | 60.0 | 56.6 |
| HDPE | 128 | 174.1 | 111 | −174.2 | 127 | 185.4 | 68.3 |
| FLEXOMER® ETS-9078 NT7 | 76, 117, 124 | 124.1 | 60, 108 | −83.7 | 110, 122 | 83.5 | 33.6 |
| FLEXOMER® DFB-9042 NT | 40, 77, 113, 128 | 96.6 | 57, 86, 104 | −60.6 | 102, 119, 122 | 58.3 | 28.7 |
| AFFINITY® PL 1850G | 76, 98 | 79.3 | 52, 80 | −73.7 | 84, 98 | 77.7 | 51.1 |
| AFFINITY® EG 8200G | 39, 53, 75 | 24.3 | 19, 45 | −19.7 | 48, 65 | 25.0 | 19.0 |
| 1 | 35, 48 | 67.1 | 19 | −58.8 | 38, 43 | 53.3 | 52.1 |
| 2 | 34, 55, 65 | 77.3 | 3, 38 | −63.6 | 51, 57, 67 | 66.8 | 43.3 |
| 3 | 60 | 66.3 | 32 | −51.4 | 56 | 59.3 | 53.0 |
| 4 | 59 | 51.6 | 32 | −39.4 | 54 | 41.1 | 41.4 |
| 5 | 19, 39, 61 | 42.0 | −3, 20 | −35.3 | 18, 31, 43 | 36.3 | 14.9 |
| 6 | 43, 70, 80 | 29.9 | −9, 28 | −45.7 | 36, 66 | 26.1 | 25.0 |
| 7 | 75 | 83.7 | 56 | −62.5 | 73.6 | 85.0 | 51.6 |

All DSC scans, heating and cooling, were at a rate of 10° C./min.
$T_{m,1}$ lists the melting point(s) during the first DSC scan.
$\Delta H_{m,1}$ lists the total heat of melting during the first DSC scan.
$T_c$ lists the crystallization temperature(s) upon cooling.
$\Delta H_c$ lists the total heat of crystallization.
$T_{m,2}$ and $\Delta H_{m,2}$ are the melting temperature(s) and heat of melting values during the second DSC scan, respectively.
$\chi_c$ lists the percent crystallinity as determined by wide angle x-ray diffraction.
ND = not detected.

TABLE 2

Mechanical properties of polymers

| Polymer | Tensile Strength (MPa) | Tensile Modulus (MPa) | Elongation (%) |
|---|---|---|---|
| SURLYN® 8940 | 27.2 ± 1.4 | 308.5 ± 17.9 | 308.8 ± 14.5 |
| VISTALON® 4709 | 20.3 ± 3.6 | 3.8 ± 0.8 | 1125.9 ± 86.4 |
| LURAN® 358N | 62.1 ± 1.6 | 1366.0 ± 88.1 | 3.5 ± 0.2 |
| STROLUX® 684D | 25.7 ± 2.7 | 759.2 ± 38.4 | 332.0 ± 43.2 |
| LUSTRAN® 448 | 29.8 ± 2.2 | 1163.3 ± 99.6 | 12.4 ± 0.2 |
| EASTAR® DN004 | 40.4 ± 7.9 | 1055.7 ± 44.1 | 23.4 ± 6.9 |
| ELVAX® 660 | 16.6 ± 1.2 | 41.9 ± 2.4 | 730.7 ± 23.9 |
| TONE® P787 | 46.5 ± 4.8 | 207.6 ± 16.4 | 1286.0 ± 43.1 |
| TONE® P767 | 38.1 ± 5.0 | 225.4 ± 8.0 | 1139.9 ± 35.2 |
| TONE® P757 | 28.2 ± 3.6 | 261.2 ± 7.8 | 707.6 ± 32.5 |
| HDPE | 19.6 ± 3.1 | 706.8 ± 56.0 | 3.6 ± 0.5 |
| FLEXOMER® ETS-9078 NT7 | 20.7 ± 3.6 | 154.0 ± 18.2 | 748.7 ± 114.7 |
| FLEXOMER® DFDB-9042 NT | 12.6 ± 0.1 | 88.1 ± 4.2 | 858.0 ± 34.1 |
| AFFINITY® PL 1850G | 30.6 ± 4.6 | 27.0 ± 0.6 | 1180.1 ± 79.6 |
| AFFINITY® EG 8200G | 9.3 ± 0.7 | 5.9 ± 0.6 | 947.1 ± 79.5 |
| 1 | 3.8 ± 0.3 | 203.2 ± 5.6 | 5.5 ± 0.9 |
| 2 | 8.5 ± 0.6 | 266.2 ± 15.1 | 5.8 ± 0.5 |
| 3 | 20.0 ± 1.3 | 141.0 ± 10.9 | 604.7 ± 39.1 |
| 4 | 8.5 ± 1.6 | 122.2 ± 9.8 | 430.7 ± 29.6 |
| 5 | 5.1 ± 0.4 | 21.5 ± 1.4 | 791.8 ± 65.8 |
| 6 | 3.7 ± 0.5 | 33.4 ± 5.1 | 270.3 ± 12.1 |
| 7 | 13.6 ± 1.1 | 296.5 ± 17.1 | 62.7 ± 6.7 |

All polymers were tested according to ASTM D1708 at a crosshead speed of 0.2 in/min or 2.0 in/min based upon percent elongation values, except for 5, which was tested according at ASTM D638 at a crosshead speed of 2 in/min. Error values are recorded as the standard deviations of at least three specimens.

In Tables 1 and 2 the following materials exhibited self-healing after bullet penetration: SURLYN®, ELVAX® 660, TONE® P787, P767 and P757, FLEXOMER® DFB-9042 NT, AFFINITY® PL1859G and EG 8200G preparations 1-6.

VISTALON® 4709 (EPDM) from Exxon Mobile Chemical was chosen due to the low melting point and high elongation. After being shot with a bullet at 25° C., a small pinhole remained. It was believed that the material was too weak to absorb enough impact of the bullet. It has been shown that absorption of the impact from a bullet increased the temperature of the polymer at impact site, which would allow the polymer to flow. No change in bullet velocity was observed after bullet penetration. When the material was shot at 70° C. the hole sealed after penetration. A vacuum was applied to the location of polymer impact, and then shut off. The suction due to vacuum remained for over 30 minutes. Loss of vacuum may have been due to loss of contact between the material and the coupling rather than due to a hole in the sample. These results indicate that polymer melt flow is essential to allow the material to seal after bullet penetration. Since this sample was shot at 70° C., which is above the melting temperature of 50° C., the polymer can flow to close the hole caused by the bullet. When the polymer was shot at 25° C., there was not enough impact absorbed by the polymer to raise the temperature of the material to the point where the polymer could melt flow. Since VISTALON® 4709 has a high molecular weight and a narrow molecular weight distribution, the polymer has a low melt flow rate.

LURAN® 358N styrene acrylonitrile (SAN) has a high tensile strength and tensile modulus, but a low elongation. When this polymer was shot the polymer split into two pieces, with the break axis radiating from the bullet hole. Although the polymer has good tensile strength and tensile modulus, the low percent elongation prevented the material from elongating to allow the hole to seal after bullet penetration. This result indicates that percent elongation is an important factor in recovery. Another reason is due to the brittle nature of both the styrene and acrylonitrile blocks, which would result in a polymer with low impact strength.

STYROLUX® 684D styrene butadiene copolymer (SBS) available from BASF has a similar tensile strength and percent elongation as SURLYN® 8940, but a higher tensile modulus. It is believed that the styrene blocks of the polymer strengthen the material, while the butadiene block allows the material to flow when shot. The hole sealed after bullet penetration, but there was residual damage to the polymer. Several cracks radiated from the impact site. Also, a ring-shaped crack surrounding the impact site remained. The brittle nature of the styrene blocks appear be the reason for the cracks in the polymer.

LUSTRAN® 448 (ABS) available from INEOS has a high tensile strength and a much higher tensile modulus than SURLYN® 8940, but has a low ultimate elongation. It was believed that the acrylonitrile and styrene blocks would impart strength and the butadiene would impart the ability to flow after bullet impact. When shot at 38° C. the hole sealed, but cracks radiated from impact site, much like STYROLUX® 684D. When the panel was shot at 80° C. no cracks radiated from the bullet hole, but the hole did not seal. Small pieces of material pulled away from the back of the panel, but were still attached to the panel. A ring around the impact site resulted (20 mm diameter), which was due to the impact of the bullet. It appears that the immediate surroundings of the bullet site were influenced by the bullet penetration, and only the polymer within that circular stress can partake in whether this material will seal. The material apparently does not have enough elastic restoring force at 80° C. to allow the hole to seal.

EASTAR® DN004 is a copolymer based upon poly(ethylene terephthalate) that also contains cyclohexane units and is available from Eastman Chemicals. The polymer was shot at 100° C., due to the brittle nature of the polymer and a $T_g$ of 83° C., which resulted in the polymer shattering into six pieces. Based upon the velocity values before and after impact (see Table 3 below) the material was still strong at 100° C. Poly (ethylene terephthalate) does not have a large impact strength, which may be why this panel fractured into many pieces.

TABLE 3

Summary of ballistic testing

| Polymer | T (° C.)[a] | t (mm)[b] | $V_{in}$[c] | $V_{out}$[c] | ΔV (%) | $d_o$ (mm)[d] | L (mm)[e] |
|---|---|---|---|---|---|---|---|
| SURLYN ® 8940 | 24 | 6.4 | 844 | 665 | 21.2 | —[f] | —[f] |
| VISTALON ® 4709 | 25 (1) | 6.8 | 1061 | 1005 | 5.3 | 0.8 | 6.8 |
|  | 70 (2) | 6.8 |  |  |  | —[f] | —[f] |
| LURAN ® 358N | 26 | 9.6 | 746 | 544 | 27.1 | 11.0 | 9.6 |
| STROLUX ® 684D | 27 | 8.1 | 829 | 736 | 11.2 | 6.5 | 2.1 |
| LUSTRAN ® 448 | 38 (1) | 9.5 (1) | 696 | N/A | N/A | 7.0 | 1.0 |
|  | 80 (2) | 9.9 (2) | 797 | 470 | 41.0 | 7.0 | 9.9 |
| EASTAR ® DN004 | 100 | 7.8 | 742 | 537 | 27.6 | 7.0 | 7.8 |
| ELVAX ® 660 | 27 | 10.5 | 980 | 894 | 8.8 | 2.5 | 8.0 |
| TONE ® P787 | 31 | 11.0 | 909 | 799 | 12.1 | 1.5 | 5.5 |
| TONE ® P767 | 27 | 9.9 | 974 | 924 | 5.1 | 2.0 | 5.5 |
| TONE ® P757 | 27 | 9.8 | 880 | 818 | 7.0 | 4.0 | 5.0 |
| HDPE | 13 | 11.0 | 887 | 748 | 15.7 | 7.0 | 11.0 |
| FLEXOMER ® ETS-9078 NT7 | 26 | 12.9 | 724 | 592 | 18.2 | 3.5 | 12.9 |
| FLEXOMER ® DFDB-9042 NT | 23 | 12.9 | 821 | 743 | 9.5 | 3.5 | 11.0 |
| AFFINITY ® PL 1850G | 29 | 12.9 | 762 | 624 | 18.1 | 2.0 | 11.0 |
| AFFINITY ® EG 8200G | 29 | 13.4 | 812 | 737 | 9.2 | —[f] | —[f] |
| 1 | 13 | 8.3 | 1050 | 1002 | 4.6 | 1.0 | 5.5 |
| 2 | 29 | 9.4 | 918 | N/A | N/A | 2.5 | 5.5 |
| 3 | 29 | 8.4 | 977 | 946 | 3.2 | 1.5 | 5.5 |
| 4 | 29 | 8.0 | 827 | N/A | N/A | 1.5 | 5.0 |
| 5 | 29 (1) | 7.5 | 940 | 934 | 0.6 | —[f] | —[f] |
|  | 29 (2) | 7.5 | 801 | 732 | 2.4 | 0.5 | 5.5 |
| 6 | 27 | 10.5 | 1042 | 999 | 4.1 | 1.0 | 7.0 |
| 7 | 27 (1) | 7.2 | 902 | N/A | N/A | 4.0 | 5.0 |
|  | 27 (2) | 7.2 | 780 | N/A | N/A | 4.0 | 5.0 |

[a]Test temperature
[b]Panel thickness
[c]Velocity in ft/sec
[d]Diameter of hole in panel left by bullet
[e]Length of hole in panel left by bullet
[f]Completely healed-no hole ELVAX® 660 is a copolymer of ethylene and vinyl acetate, with a composition of 12.5% vinyl acetate. It was believed that the vinyl acetate component would decrease the crystallinity of the polymer relative to pure polyethylene. This would allow the polymer to flow before crystallizing too quickly, unlike polyethylene. Also, highly crystalline polymers are known to have low impact strengths. The hole did seal after being shot, but only as a dimple protruding from the back of the panel. The hole tapers from impact side to exiting side of the panel. The appearance of the dimple was transparent, which may be due to the polymer not crystallizing to a large extent at that site. ELVAX® 660 has similar tensile strength as SURLYN®, but a much lower tensile modulus and higher percent elongation. It appears that the tensile modulus is an important factor in the ability of the material to absorb impact from a bullet. The modulus of ELVAX® 660 appears to be too low to absorb enough of the impact to raise the temperature to a point where the polymer can flow. Possibly the crystallinity is still too high (28%) to self-heal to a greater extent, even though the melting points are relatively low.

High density polyethylene was tested as a standard to compare with SURLYN® and ELVAX® 660. The results were that the material had a hole with a diameter of 7 mm through the panel, with cracks radiating from the hole. It is known that polymers with high degrees of crystallinity and large spherulitic structures have low impact strength. Such polymers would be poor candidates for self-healing polymers due to the low impact strength. The results from this polymer suggest that the ability to self-heal is dependent upon the crystalline properties of the polymer. Since this polymer had a constant hole through the panel and ELVAX® 660 had a hole that tapered towards the back of the panel, it appears that the higher degree of crystallinity of HDPE (68%) relative to ELVAX® 660 is one reason for the difference in residual damages between these two polymers.

SURLYN® 8940 is a copolymer of ethylene and partially neutralized methacrylic acid. When this material is shot, the hole seals with a different appearance, depending upon the bullet velocity. At higher velocities there is a small central point in the dimple that protrudes outwards on the penetration side of the panel in a kind of "crater"-shaped appearance. The depth of the internal cavity of the "crater" increases as bullet velocity increases. At 1118 ft/sec a depth of 4 mm remained with a diameter of 1.5 mm (impression had a 6 mm width). It appears that the material snaps back after bullet penetration. At all velocities there is a small conical protrusion on the exit side of the panel. The low degree of crystallinity of this polymer (19%) may play an important part in its self-healing, along with its low melting points.

NUCREL® 925 is a copolymer of ethylene and methacrylic acid. When this material is shot at 24° C., the hole seals. The hole does not heal to same extent as SURLYN® 8940 under the same conditions. This may due to the size of the lamella. The lamellar thickness in NUCREL® is larger than in SURLYN®. The smaller lamellar size may allow for easier melting of the lamella, and hence a greater amount of material is available to flow after the material is shot. At 13° C. NUCREL® 925 does not heal completely, while SURLYN® 8940 does heal.

TONE® P787 is poly(caprolactone). It has very similar thermal and tensile properties as SURLYN® 8940. Whereas SURLYN® 8940 has two melting peaks due to cluster order-disorder transition (50° C.) and polyethylene crystallites melting (90° C.), TONE® P787 has one melting transition (56° C.). TONE® P787 has a hole with a diameter of 1.5 mm that is 5.5 mm deep, with the remaining hole sealed, when shot at approximately 900 ft/sec. The results of TONE® P787 testing indicate that the presence of ionic clusters is not a requirement for a polymer to seal upon bullet penetration. It appears that it is a combination of good tensile properties along with a moderate level of crystallinity and a low melting point. The methacrylic acid units break up the crystallinity of polyethylene in SURLYN®. This may be a major reason why SURLYN® 8940 seals and polyethylene does not. NUCREL® 925, which is the acid analog of SURLYN®, does seal at ambient temperatures, but not as effectively as SURLYN® 8940 at lower temperatures. TONE® P787 may have smaller spherulitic structures than HDPE, which may be a reason why it seals and HDPE cracks and does not heal.

The degree of crystallinity of SURLYN® 8940 (15.7%) is much less than that of TONE® P787 (55.4%). The percent crystallinity of poly(ethylene-co-methacrylic acid) ionomers, based upon heat of melting values, is approximately 10-20% relative to 100% crystalline polyethylene. Poly(caprolactone) has a degree of crystallinity of approximately 40-50% based upon 100% crystalline poly(caprolactone). Polycaprolactone also crystallizes very quickly. This higher degree of crystallinity, larger crystal size, and fast crystallization rate may be why TONE® P787 does not heal as well as SURLYN®. More energy is required to melt a material with a higher degree of crystallinity than those with a lower degree of crystallinity. Also, the fast crystallization rate limits how much material flows before it cools. TONE® P787 may have smaller crystal structures than HDPE, which may be why it has higher impact strength than HDPE.

Both SURLYN® 8940 and NUCREL® 925 heal upon bullet penetration at 24° C. NUCREL® 925 leaves an impression with a greater depth than SURLYN® 8940 (1.5 mm vs. 0.5 mm). The SURLYN® 8940 sample was 7.0 mm thick and the NUCREL® was 6.5 mm thick. Both dimples are 9 mm in diameter, which is the diameter of the bullet used in this study. Both samples display radial cracks emanating from the interior of the puncture to the exterior of the puncture. SURLYN® 8940 has a more pronounced cone on the exit side of the panel than NUCREL® 925.

Two other grades of TONE®, TONE® P757 and TONE® P767, were tested and compared to TONE® P787. TONE® 757 is the lowest molecular weight polymer of the series and the greatest melt flow of the three polymers. The initial diameter of the hole is 4.0 mm and tapers towards the back of the panel. The hole is 5.0 mm deep. The back of the panel has a slight convex shape where the bullet passed through the panel. TONE® P767 has properties in between P757 and P787. The initial hole was 2.0 mm, which tapered towards the back of the panel. The back of the panel was very similar in appearance as P757. Increasing melt viscosity may be the reason for smaller residual damage in the TONE® series. The increased melt viscosity may allow the polymer to snap back to a greater extent after the bullet passes through the panel.

A series of very low density polyethylenes (VLDPEs) were studied to compare to HDPE. These VLDPEs included: FLEXOMER® DFDB-9042 NT, FLEXOMER® ETS-9078 NT 7, AFFINITY® PL 1850G, and AFFINITY® EG8200G. The FLEXOMER® series is based upon ethylene-1-butene copolymers, while the Affinity® series is based upon ethylene-1-octene copolymers. It was speculated that long side-chain branching would reduce crystallinity to the point where the polymer could withstand the impact of the bullet, as well as being able to flow without crystallizing too quickly.

Both FLEXOMER® polymers tested had similar results. X-ray analysis showed that both polymers were about 30% crystalline, which were much lower than. HDPE. Also, both of these polymers had regions of low melting points (Table 1), which should be in the temperature range obtained by the impact site after the bullet passes through the panel. FLEXOMER® DFDB-9042 NT had a hole that persisted about 85% of the way into the panel, but was sealed the rest of the way. FLEXOMER® ETS-9078 NT7 had a hole that persisted through the panel, ending in a 0.5 mm hole at the end of a small cone-shaped protrusion on the back of the panel. Both polymers showed a high degree of crystallization, as evidenced by the second heat of melting values. Perhaps the degree of crystallinity and the rate of crystallization prohibited these polymers from healing well.

The AFFINITY® polymers behaved very different from one another. The AFFINITY® PL1850G result was very similar to FLEXOMER® DFDB-9042 NT. The hole in AFFINITY® PL1850G persisted 85% of the way into the panel, leading to a transparent protrusion on the back of the panel. This transparency is probably due to lack of crystallinity, much the same as in the case of ELVAX® 660. AFFINITY® EG8200G sealed as well as SURLYN® 8940. Due to the low degree of crystallinity (19%), the polymer was transparent and rubber-like in appearance. A line of dark-colored material remains through the polymer, which may be due to the metal of the bullet. One the impact side of the panel there is a slight impression of a depth of 0.5 mm, with the center of the impression coming out to the level of the panel surface. The back of the panel has a slight protrusion of a length of 1.0 mm. AFFINITY® EG8200G has several melting points, all of which are ≦75° C. This would allow most of the material to melt, assuming enough impact is absorbed by the panel during bullet impact. Based upon the bullet velocity values before and after penetration, there should have been enough impact absorbed by the panel to cause a significant increase in temperature at the impact site. Since this polymer also has a low degree of crystallinity, a significant amount of melted polymer should be available to seal any hole. The combination of a low degree of crystallinity, small crystal size, and low melting temperatures appears to be the properties required for polyethylene-like polymers to self-heal. The low tensile strength and modulus appeared to have no effect on the self-healing ability of this polymer. This polymer is opposed to VISTALON® 4709 in that AFFINITY® polymers would have a broad molecular weight distribution, allowing for better melt flow than VISTALON® 4709.

Shown in FIG. 1 is what is believed to occur when a bullet passes through a self-healing polymer. In depiction 2 the bullet starts to pass through the polymer sample. At this point the bullet "parts" the material along with pulling some polymer along with it. Any impact of the bullet absorbed by the panel will increase the temperature at that site, thereby allowing the polymer to flow and elongate to a greater extent. Immediately after the bullet passes through the panel (depictions 4-5) the hole should be the same diameter as the bullet diameter. However, as the material starts to "snap back" after bullet penetration, the hole that needs to be sealed will decrease. Due to the polymer "snapping back" and the melt-flow ability of the polymer at the impact site, a much smaller hole than the bullet diameter will need to be sealed (depictions 5-8). As the final stage is reached, only a slight residual damage should be evident (depiction 10). This healing process is instantaneous, requiring high speed cameras to view this process. This Figure points out some significant facts. One is that one needs to have a polymer that does not crystallize quickly. A polymer that crystallizes quickly would prevent the hole from sealing effectively. A highly crystalline material would also require a lot of heat to allow significant melt flow for healing to occur. Therefore, polymers that have a careful control of the amount of crystallinity, as well as crystal size, are candidates for self-healing polymers. The melting points could determine the application of these polymers. Although room temperature tensile elongation values may be informative, they are misleading. Since the temperature at the impact site will be increased by the bullet impact, the elongation ability of the polymer will increase. Therefore, even though the polymer should be able to elongate with the bullet, it may not be a vital factor in the development of self-healing polymers.

Based upon the foregoing results of the testing of commercial polymers, new polymers were synthesized that would self-heal. Initial syntheses focused on aliphatic-based polyesters due to the promising results of TONE® P787. The goal of these polyesters would be to obtain polymers with tensile properties comparable to SURLYN® 8940 and TONE® P787, yet control the melting point and degree of crystallinity. TONE® P787 polymers are synthesized via anionic ring-opening polymerization of caprolactone. A much wider range of aliphatic polyesters could be synthesized using standard condensation polymerization of aliphatic diols and dicarboxylic acids.

The polymers synthesized in this work were synthesized via melt polymerization of aliphatic diols and aliphatic dicarboxylic acids. Although a wide range of aliphatic polyesters have been synthesized since the first reports of Carothers, many of these polyesters were of limited molecular weights. Useful data could be obtained from these polymers, such as crystal forms, melting points, and crystallization temperatures, but most of these polymers would be brittle. High molecular weight aliphatic polyesters are required to withstand a bullet impact. The polymers in this work were synthesized to high molecular weights under high vacuum at high temperatures. These polymerizations were stopped after the molten polymers formed a ball around the stir blade, indicating high molecular weight polymer formation.

The melting points of the polyesters can be tailored through appropriate selection of the diols and dicarboxylic acids. By mixing several dicarboxylic acids, the degree of crystallinity should be lowered relative to the homopolymers. In some cases this also led to a difference in crystallization rates, as evidenced by lower heat of melting values upon the second differential scanning calorimetry (DSC) scans. It has been reported that mixing diols in polyesters also has the same effect.[21] In this work, this same strategy was also pursued. Also, mixed dicarboxylic acids were synthesized with the same goal as the mixed diols.

Initial polymerization of ethylene glycol with azelaic acid and sebacic acid led to a polymer (1) with a melting point of 43° C. on the first run, and melting points of 38 and 41° C. on the second scan. The heat of melting values (table 1) indicates that there is a lower degree of crystallinity using mixed dicarboxylic acids than the respective homopolymers. This polymer, when shot at 1050 ft/sec at 13° C., exhibited slightly better self-healing than TONE® P787 at the same temperature. This polymer had a very similar tensile modulus value (203.2±5.6 MPa) as TONE® P787 (207.6±16.4 MPa). The percent elongation was much lower than TONE® P787, which may indicate that a large percent elongation may not be necessary to have a self-healing polymer, as speculated earlier in this paper. Since heat is generated at impact site, the percent elongation will increase relative to its room temperature value. This polymer also had a lower percent crystallinity than TONE® P787, which may be why it heals slightly better.

A subsequent polymer synthesized from ethylene glycol, diethylene glycol, and 1,10-decanedicarboxylic acid led to a polymer with melting points of 51 and 61° C. on the first DSC scan, and 48, 55, and 61° C. on the second scan. This polymer also self-healed when it was shot at 29° C. The residual hole is very similar to that of TONE® P787. This polymer has a higher tensile modulus (266.2±15.1 MPa) than TONE® P787. This polymer, as well as the previous polymer, has much lower tensile strengths and elongations than TONE® P787. This indicates that these two features may not be critical characteristics necessary for self-healing polymers.

Next, blends of TONE® P787 with a polyester based upon diethylene glycol and azelaic acid were made in an attempt to lower the crystallinity to TONE® P787. The polyester from diethylene glycol and azelaic acid has a melting point of −56° C. and a heat of melting of 11.7 J/g on the first DSC scan. Polymer 3 was 75% (w/w) TONE® P787 and 4 was 50% (w/w) TONE® P787. Both blends ended up having similar damages as TONE® P787. As the TONE® P787 content decreased, the tensile strengths, moduli, and elongations all decreased. Even though the heat of melting values and percent crystallinity of the blends were lower than the heat of melting of TONE® P787, it appears that these did not have any effect on increasing or decreasing the self-healing characteristics of TONE® P787.

A poly(ester-amide) was synthesized from ethylene glycol, azelaic acid, and 11-aminoundecanoic acid. The nylon 11 component (20 mol %) was added in an attempt to increase the tensile properties relative to the polyester homopolymer. The effect was opposite in that a rubbery polymer was made. This polymer had a low degree of crystallinity, as evidenced by the low heat of melting values and x-ray diffraction.

This polymer self-healed upon bullet penetration. The molded panel had apparent regions of stress as evidenced by the opaque regions in the panel. It was believed that the uneven cooling of the polymer led to this result. The portion of the polymer that was shot in the opaque region did not heal as well as the portion shot in the transparent region. Even though both regions healed, the transparent portion healed better with no residual depth to the remaining hole. On the back of the panels there were indentations going slightly inwards towards the panel. This polymer has a much lower tensile modulus (21.5±1.4 MPa) than TONE® P787. This polymer has a higher tensile modulus than VISTALON® 4709 (3.8±0.8 MPa), and both have relatively the same melting points (45° C. vs. 49° C.). It appears that the poly(ester-amide) has a large enough tensile modulus to absorb enough of the impact to allow melt flow of the polymer. This may indicate that there is a minimum limiting value on the tensile modulus to allow the polymer to self-heal. Another possibility is that 5 has better melt flow properties than VISTALON® 4709.

Another poly(ester-amide) (6) was synthesized from ethylene glycol, azelaic acid, and 11-aminoundecanoic acid with an increased nylon 11 component (33 mol %). This polymer also was rubbery in nature. The low heat of melting values, and x-ray data, also indicate a low degree of crystallinity. This polymer also had residual areas of stress due to uneven cooling of the panel upon compression molding. The polymer self-healed upon bullet penetration, but the damage was slightly greater than the previous 5. The back of the panel was smooth except for a slight amount of melted polymer sticking out. The tensile modulus of this polymer (33.4±5.1 MPa) was greater than 5 (21.5±1.4 MPa). The difference cannot be explained due to the tensile moduli.

Finally, a polyester was synthesized containing aromatic units in an attempt to increase tensile properties while maintaining a sufficient percent elongation. A polyester containing ethylene glycol, 1,12-dodecanedioic acid, and 14 mol % p-α, α"-xylenediol was synthesized and found to self-heal to a much lesser extent than the other new polymers in this paper. The tensile modulus of this polymer (296.5±17.1 MPa) was similar to other self-healing polymers in this work (SURLYN®, TONE® P787, 2). Incorporation of the aromatic groups also seemed to lower impact resistance because the back of the panel at the impact site had slight cracking along with the slight protrusions emanating from the panel.

The polymers studied in the work describes herein offer some insight into the understanding of why SURLYN® 8940 self-heals after bullet penetration. Impact resistance was found to be an essential feature of self-healing polymers. Polymers with low impact resistance may self-heal, but cracking of those panels are very detrimental. The cracking lowers the tensile properties of the polymer, and also leads to areas where gases can penetrate through the cracks. These polymers would not be suitable for use in atmospheric containment in space.

The self-healing success of AFFINITY® EG8200G revealed that ionic content is not required for self-healing polymers. The low melting points, low crystallinity, good melt flow, and sufficient mechanical properties to raise the temperature at impact site appear to lead to the ability of this polymer to self-heal. Polymers exhibiting melt index values above about 2.5 g/10 min. as determined by mass flow rate under ASTM D1238 at 190° F., 2.16 kg weight and at least some of the foregoing properties exhibit the best self-healing properties. Although the low melting points may limit the upper use temperature of this polymer, it is sufficient for use in space objects since the temperature is approximately 25° C.

The tendency of TONE® P787 to self-heal also led to the initial syntheses of a variety of aliphatic polyesters, poly(ester-amide)s, and aromatic-aliphatic polyesters. These polymers displayed varying degrees of self-healing ability.

The polyesters and poly(ester-amides) described above were synthesized using standard melt-condensation techniques. Tetrabutyl orthotitanate or dibutyltin oxide was used as the catalyst. After initial esterification at 200° C. for 3 h, high vacuum was applied and the temperature was increased to 260° C. Polymerizations were carried out until the polymers formed a ball around the stir blade.

The polymers were compression molded under vacuum into 3"×3" or 6"×6" panels between KAPTON® films. Compression molding temperatures and pressures were dependent upon the properties of each polymer. Tensile bars were molded using a Dynisco Polymer Test Laboratory Mixing Molder equipped with an Athena Temperature Control Unit. Tensile bars were molded using an ASTM D1708 mold. One polymer was punched out of a thin panel using an ASTM D638-5 modified mold.

Ballistic testing was accomplished by clamping the polymers into a stand before being shot. Temperature control could be obtained using an oven with a 3" diameter hole cut in it to allow the bullet to pass through the oven. A Smith & Wesson semiautomatic pistol, equipped with a laser sight, on a gun stand was used as the weapon. Bullet velocities were controlled by appropriate powder loading of the bullets (9 mm). The location of chronographs before and after the panel recorded velocities before and after impact. A steel backstop filled with sandbags stopped the bullets. These tests were performed at NASA Langley Research Center.

The properties of the recited polymers were obtained using a Sintech 2W Instron according to ASTM D1708 or ASTM D638 at crosshead speeds of 0.2"/min or 2.0"/min, depending upon polymer elongations. Differential scanning calorimetry was conducted using a Perkin-Elmer Pyris 1 Differential Scanning Calorimeter. X-ray analysis on molded samples were analyzed using a Siemens D5000 diffractometer (CuKά, Ni filtered, 45 kV, 40 mA).

Various structures such as fuel tanks, space residences etc. can be fabricated from the self-healing polymeric materials described above by molding, welding of flat panels or otherwise. Fuel tanks fabricated from the various self-healing polymers must, of course exhibit resistance to contained fuels or other contained materials. For example, while SURLYN® exhibits superior self-healing properties, it demonstrates very little compatibility with conventional fuels. The TONE® polymers and the synthesized polyester materials described above exhibit excellent resistance to conventional fuels while also exhibiting good self-healing properties.

There have thus been described a series of polyester materials that offer self-healing properties as well as formed structures of commercial and newly synthesized polymeric materials that exhibit self-healing properties when penetrated by a bullet or similar high velocity projectile.

As the invention has been described, it will be apparent to those skilled in the art that the same may be varied in many ways without departing from the spirit and scope of the invention. Any and all such modifications are intended to be included within the scope of the appended claims.

What is claimed is:

1. A self-healing polymeric material comprising copolymers consisting of poly(ester amides) synthesized from ethylene glycol, azelaic acid, and 11-aminoundecanoic acid, wherein said polymeric material is characterized with a melt index above about 2.5 g/10 min. as determined by mass flow rate under ASTM D1238 at 190° C./2.16 kg, and impact resistance and ductility sufficient to resist cracking and brittle fracture upon impact by a 9 mm bullet fired at a temperature of about 29° C. at subsonic speed of about 800 to about 1000 feet/sec.

2. The polymeric material of claim 1, wherein the polymeric material exhibits a melting or softening temperature between about 20° C. and about 65° C. and room temperature elongation of between about 200 and about 1300 percent.

* * * * *